(12) United States Patent
Wilker et al.

(10) Patent No.: US 8,319,119 B2
(45) Date of Patent: Nov. 27, 2012

(54) SECTION FOR A WINDOW, DOOR OR FACADE ELEMENT COMPRISING AN ELECTRIC CABLE

(75) Inventors: Burkhard Wilker, Bielefeld (DE); Carsten Hanke, Bielefeld (DE)

(73) Assignee: Schuco International KG, Bielefeld (DE)

( * ) Notice: Subject to any disclaimer, the term of this patent is extended or adjusted under 35 U.S.C. 154(b) by 834 days.

(21) Appl. No.: 11/814,078

(22) PCT Filed: Jan. 10, 2006

(86) PCT No.: PCT/EP2006/050127
§ 371 (c)(1),
(2), (4) Date: May 13, 2010

(87) PCT Pub. No.: WO2006/074998
PCT Pub. Date: Jul. 20, 2006

(65) Prior Publication Data
US 2010/0229479 A1 Sep. 16, 2010

(30) Foreign Application Priority Data

Jan. 14, 2005 (DE) .................... 20 2005 000 579 U
Jan. 14, 2005 (DE) .................... 20 2005 000 580 U
Jan. 14, 2005 (DE) .................... 20 2005 000 609 U

(51) Int. Cl.
*H02G 3/08* (2006.01)
(52) U.S. Cl. ....... 174/481; 174/480; 52/220.5; 52/220.7

(58) Field of Classification Search ................. 52/220.1, 52/220.5, 220.7, 204.5, 204.1, 238.1, 239; 174/480, 481
See application file for complete search history.

(56) References Cited

U.S. PATENT DOCUMENTS

| | | | | |
|---|---|---|---|---|
| 3,524,477 A * | 8/1970 | Steger, Jr. ................... | 138/106 |
| 4,017,137 A * | 4/1977 | Parks ............................ | 439/135 |
| 4,216,823 A * | 8/1980 | Keldmann ...................... | 165/55 |
| 4,990,098 A * | 2/1991 | Neidecker et al. ............ | 439/207 |
| 5,024,614 A * | 6/1991 | Dola et al. ................... | 439/114 |
| 5,180,890 A * | 1/1993 | Pendergrass et al. ........ | 174/117 F |
| 5,336,849 A * | 8/1994 | Whitney ...................... | 174/72 C |
| 5,784,841 A * | 7/1998 | Nowell ....................... | 52/220.5 |
| 5,881,500 A * | 3/1999 | Latino et al. ................ | 52/36.1 |
| 6,191,363 B1 * | 2/2001 | Samuels ...................... | 174/68.3 |
| 6,350,135 B1 * | 2/2002 | Acklin et al. ................ | 439/211 |
| 6,861,583 B1 * | 3/2005 | Ryals et al. ................. | 174/507 |
| 2003/0205010 A1 * | 11/2003 | Anglin et al. ............... | 52/238.1 |

FOREIGN PATENT DOCUMENTS

EP 0475417 B2 3/1992
EP 1094186 A1 * 4/2001

* cited by examiner

*Primary Examiner* — Brian Glessner
*Assistant Examiner* — Adriana Figueroa
(74) *Attorney, Agent, or Firm* — Barnes & Thornburg LLP

(57) ABSTRACT

The present disclosure relates to a frame section for a window or casement frame of a window, door or facade. The frame section includes an undercut cable groove, which is situated on the outer periphery of the frame section and is designed to hold an electric cable including two or more electric conductors in a positive fit. The frame section has a centering frame for the cable, which can be placed over the cable.

42 Claims, 13 Drawing Sheets

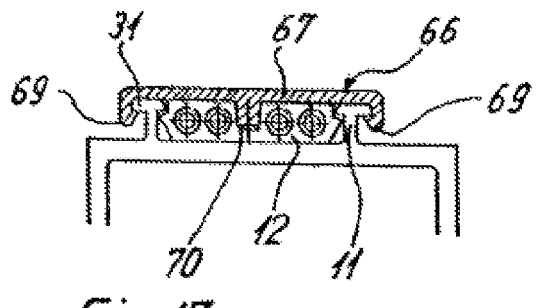
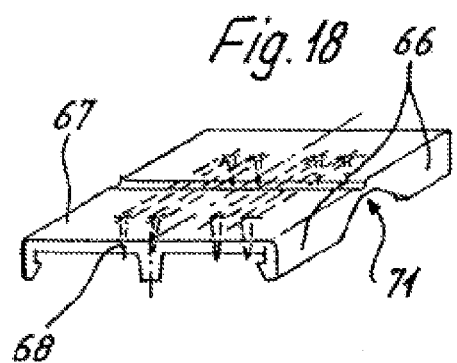
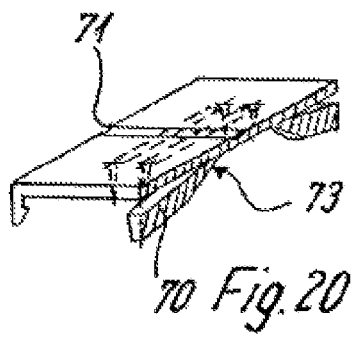
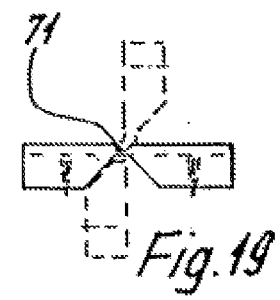
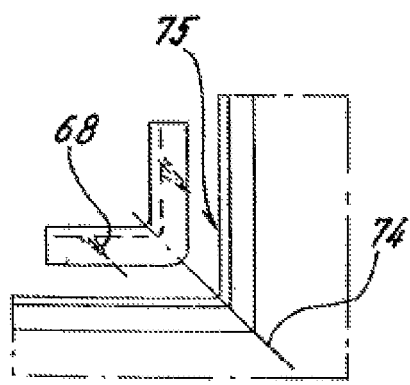
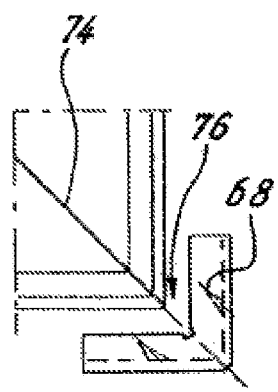

SECTION FOR A WINDOW, DOOR OR FACADE ELEMENT COMPRISING AN ELECTRIC CABLE

CROSS-REFERENCE TO RELATED APPLICATIONS

This application is a National Phase Application that relied for priority on PCT/EP2006/050127, filed on Jan. 10, 2006, which relies for priority upon German Patent Application No. 20 2005 000 609.2, filed Jan. 14, 2005, on German Patent Application No. 20 2005 000 580.0, filed on Jan. 14, 2005, and on German Patent Application No. 20 2005 000 579.7, filed on Jan. 14, 2005, the contents of all of which are incorporated herein by reference.

FIELD OF THE INVENTION

The invention relates to a section for a window, door or facade element and to a window, door or facade element having such a section.

DESCRIPTION OF THE RELATED ART

In windows or doors with electrical functional components, such as, electromotor or electromagnetic drives, in fittings or sensors, or with other power consuming devices, it is necessary to lay a cable leading to the electrical, functional elements to provide a power supply and/or to provide signals for the control of such elements.

According to the state of the art, in facades, cables are led for this purpose through hollow chambers, or laid loosely on the outer periphery of the facades. EP 0 475 417 B2 describes a cable guide through such hollow chambers in a facade. The patent describes a construction for a facade with a cable groove, which is arranged on the outer periphery of an insulation section or an external section in the area of the glazing rebate or recess, for holding an electric cable in a positive fit. As may be appreciated, there are certain disadvantages with this design, including particularly the difficulty of establishing contact in the area of the glazing rebate or recess. In addition, the arrangement of the cable in a humid area on the facade entails risks of leakage currents and corrosion.

Moreover, the known arrangements are often visually not satisfactory and, for other reasons as well, fail to satisfy the requirements of modern mounting procedures. For example, because the hollow chambers must be closed in the corner area with corner connections it may be necessary to include additional processing, for example, milling, for laying the cable through the corner area Also, additional functional components may need to be arranged in grooves in which the cable has been introduced. The cables are, then, in a nearly open and unprotected position, thus interfering with the visual appearance of the facade. In addition, the cables interfere with the mounting of the facade and increase the cost of production. In addition, expensive contacts or connections are required.

A special problem arises because electrical connection devices often are connected only with difficulty to the electric cable.

SUMMARY OF THE INVENTION

The purpose of the invention is to solve at least the last mentioned problem and to improve the section and the electric cable in such a way that connectors or similar parts can be connected easily to the cable.

The invention addresses this problem in the context of a window, door or facade element.

The present invention provides a frame section for a window or casement frame of a window, door or facade, with an undercut cable groove. The cable includes two or more electrical conductors. The cable groove is arranged on the outer periphery of the section. The present invention also presents a centering frame for the cable, which may be placed over the cable and fixed to the section.

In the meaning used in the application, the term section denotes either a multi-component, composite section or an individual metal section included in the manufacture of a window or casement frame.

The cable groove provides, in the simplest way, a space saving, visually advantageous, accommodation of a multi-core electric cable directly on the section, particularly on one of the sections of the casement frame. An accommodation on the window frame is also conceivable, but the arrangement on the casement frame is preferred, if one of either a power consuming device or functional components is to be supplied with power and/or control signals from a controller.

The centering frame presents a defined position relative to the cable, particularly to the ribbon cable, and ensures that the conductors of the cable, come into contact at a defined place with a connector. The connector may be an insulation piercing connector or a cutting contacts connector (piercing connectors). The mounting is, thus, clearly simplified.

It is preferred to provide the cable jacket with a groove-like indentation, which extends preferably parallel to the conductors. With this construction, the centering frame preferably presents a corresponding bar for engagement in the indentation, which reliably ensures the centering of the cable jacket in the groove in a simple way. It is preferred for the indentation and the bar to present corresponding, conically tapering (V-shaped), cross sections for this purpose, so that they "find" or mate with each other when mounted, and become aligned in a self learning process (or self-aligning process).

It is particularly preferred to insert a contact connector, particularly a piercing connector, in the centering frame.

Such a connector is well suited if the cable groove is formed within a peripheral, larger, groove, particularly within a fitting groove. Disposed on the frame section, a fitting groove is adapted to receive fittings of a variety of types. In this way, the larger, peripheral groove is used for the engagement of the centering frame and the smaller cable groove may be filled completely by the ribbon cable. The centering frame is then placed preferably to appropriately engage the fitting groove. It is also conceivable to arrange the centering frame to engage the cable groove, for example, if the latter is constructed in the manner shown in FIG. 4. Instead of engagement connections, it is also conceivable to use clamp or screw connections between the centering frame and the section, although those connections are less preferred.

The cable groove also may be molded or shaped simply during the manufacture of the section, without the need for any additional work steps, beyond those required in any case for manufacturing the section.

The cable groove, the cable and the associated centering frame in themselves and in their interaction simplify the mounting considerably. This advantage becomes particularly clear when the proposed ribbon cables are used, which are simply snapped into the cable groove. However, it is also conceivable to use cables that have a shape that deviates from the ribbon geometry, such as, for example, cables with a slightly oval cross section.

A variant of the invention again has the purpose of solving one of the problems mentioned above, namely to improve the section, as well as the electric cable and the connector, in such a way that an easy mounting of these components is ensured in a simple way.

To solve this problem, and in a further embodiment, the invention encompasses a frame section for a window or a casement frame of a window, door or facade. More specifically, the invention encompasses a casement frame section with a cable groove arranged on the outer periphery of the section. The cable groove is adapted to hold an electric cable with at least two or more electrical conductors. The cable groove also may include a connector, which may be mounted on the section, and which has insulation piercing contacts for contacting the conductors of the cable.

It is advantageous to use an undercut cable groove design, and again to place on the cable a centering frame, which can be attached to the section.

The connector with insulation piercing or cutting contacts can be mounted on the section without using any tools. Accordingly, in a rapid and safe way, the connector reliably contacts the conductors of the cable.

The insulation piercing contacts are advantageously designed as piercing contacts, because the latter is manufactured at an advantageous cost. Moreover, the insulation piercing contacts allow the rapid establishment of a contact with the conductors without the use of tools.

It is beneficial if the connector is designed for direct or indirect engagement (or mounting) on the cable groove or another groove of the section. When the connector is mounted on a groove, contact with the conductor may be made via a piercing contact through the sheathing of the cable without the need for tools.

This concept supported by including the centering frame for the cable, which may be placed on the cable and attached to the section, and in which the connector can be inserted. This concept also is supported by the formation of the cable as a ribbon cable presenting several mutually parallel conductors or stranded wires arranged in a plane. Furthermore, in this embodiment, the cable jacket is provided advantageously with a groove-like indentation, and the centering frame presents a corresponding bar for engagement in the indentation.

In this way, the centering frame, after it has been mounted, presents a defined position relative to the cable, particularly to the preferred ribbon cable. The centering frame ensures the ability to reliably contact the conductor of the cable, particularly a ribbon cable, at a defined place with the connector, for example, with insulation piercing contacts. Thus, the mounting is again clearly simplified.

The cable groove, the cable, the connector, and the associated centering frame each, by themselves, and in their interaction, considerably facilitate the mounting. This advantage becomes particularly clear if the proposed ribbon cable is used, which may be snapped simply into the cable groove. However, it is also conceivable to use cables having a shape that deviates from that of the ribbon geometry, such as, for example, cables with a slightly oval cross section.

Furthermore, in an additional, alternative solution of the posed problem, the invention provides a frame section for a window or casement frame of a window, a door or a facade with a cable groove arranged on the outer periphery of the section. The cable groove accommodates an electric cable with at least two or more conductors. The cable groove includes a connector or connector part with insulation piercing contacts for contacting the conductors of the cable, which connector or connector part can be mounted preferably by engagement on the cable.

The connector, with its insulation piercing or cutting contacts, is preferably mounted rapidly and reliably without the use of tools, and it reliably contacts the conductor of the cable.

Advantageously, the insulation piercing contacts are designed as piercing contacts, because the latter can be manufactured at an advantageous cost. Moreover, piercing contacts allow a rapid contacting without the use of tools.

If the connector according to this variant is designed for direct or indirect engagement on the cable groove, at least one advantage is realized. Specifically, the connector may be mounted, largely without tools, on the section including the cable groove.

The invention provides, besides individual sections, also complete window, door or facade elements with such sections.

BRIEF DESCRIPTION OF THE DRAWINGS

The invention is described in greater detail below with reference to the drawings and with reference to various embodiments. In the drawings:

FIGS. 17-19 show different views of a second piercing connectors contemplated for use with the present invention;

FIGS. 21, 22 show the installation situation for two different variations of a piercing connector when positioned in the corner area of two adjacent sections;

FIGS. 24*a-c* show different views of a ribbon cable for the section of FIG. 23 and also illustrate a connector employed in association with it.

DESCRIPTION OF EMBODIMENT(S) OF THE INVENTION

Figure 1:
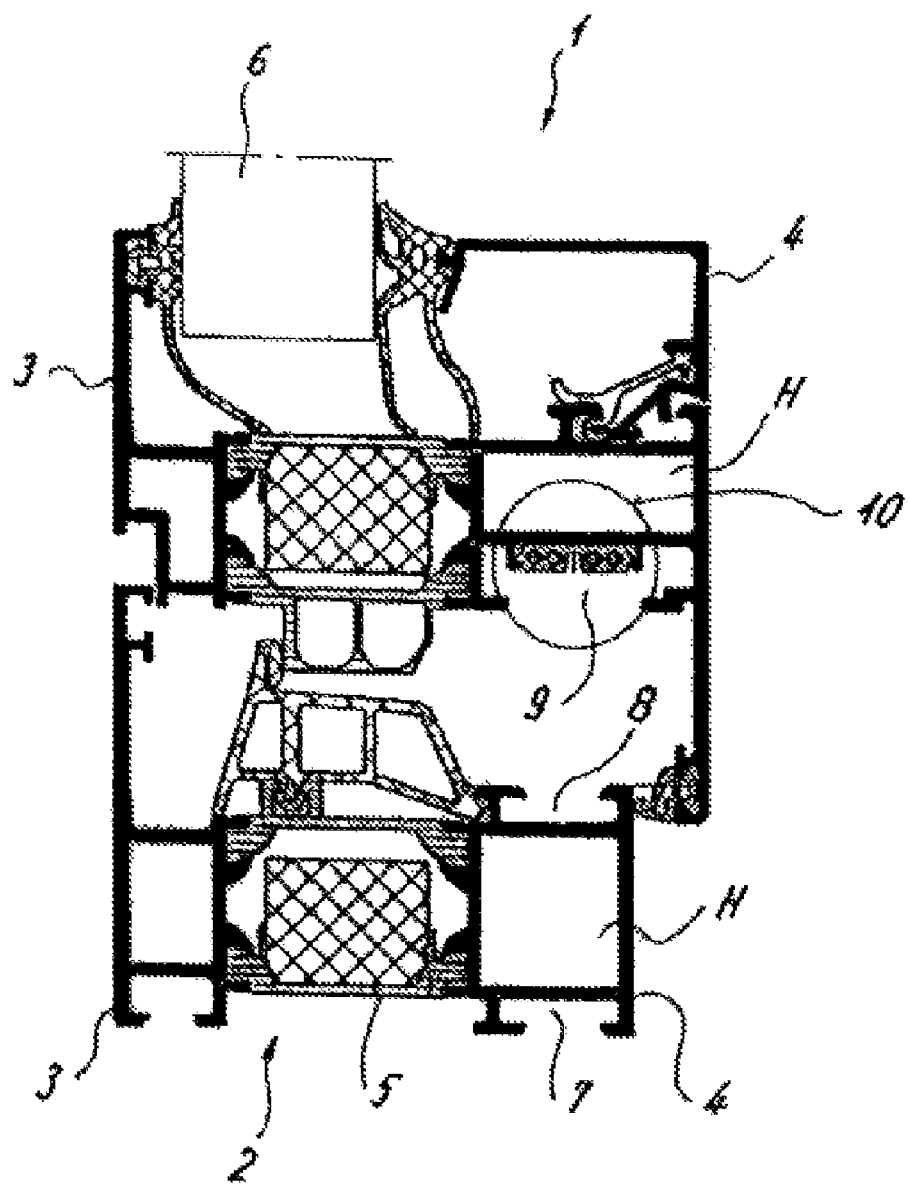
FIG. 1 shows a partial section of the window.

FIG. 1 shows a partial section of a window, consisting of a casement frame 1, which is arranged in a movable manner in a window frame 2. The window frame 2 is connected, for example, to masonry, or is incorporated into a facade.

The sections of the casement frame 1 or of the window frame 2 are manufactured as composite sections. The casement frame 1 or the window frame 2 present an outer shell 3 and an inner shell 4, as well as a heat insulation zone which connects the outer shell 3 to the inner shell 4. The heat insulation zone is made of plastic insulation bars 5.

The outer shell 3 and the inner shell 4—i.e., the individual sections of the composite section—are each manufactured as metal sections, and they consist, for example, of a light-weight metal material or of steel. In the alternative, the outer shell 3 and the inner shell 4 may be made from wood or plastic. For example, in warmer climate zones, or in the interior construction of buildings, a composite construction with an insulation bar 5 may be omitted altogether. An insulation glass pane 6 is inserted in the casement frame 1.

The individual sections 3, 4 of the casement frame 1 and of the window frame 2 each present hollow chambers H as well as different grooves on their outer peripheries. The different groves include case grooves 8, 9 for receiving corresponding functional components, such as, fitting parts or drive mechanisms, for example, for latching the casement to the window frame, or for opening and/or closing the casement.

The fitting grooves 8, 9 are formed particularly on the mutually facing sides of the casement frame 1 and of the window frame 2. A casement frame groove 7 ensures a form fitting connection with adjacent components (e.g., a facade, additional windows, doors, etc.) or a connection to the wall. The hollow chambers H are used particularly to receive corner connections and heat insulation.

The sections 3, 4 are made preferably of metal, particularly a light-weight metal. Theoretically, they may also consist of wood or plastic.

Figure 2:
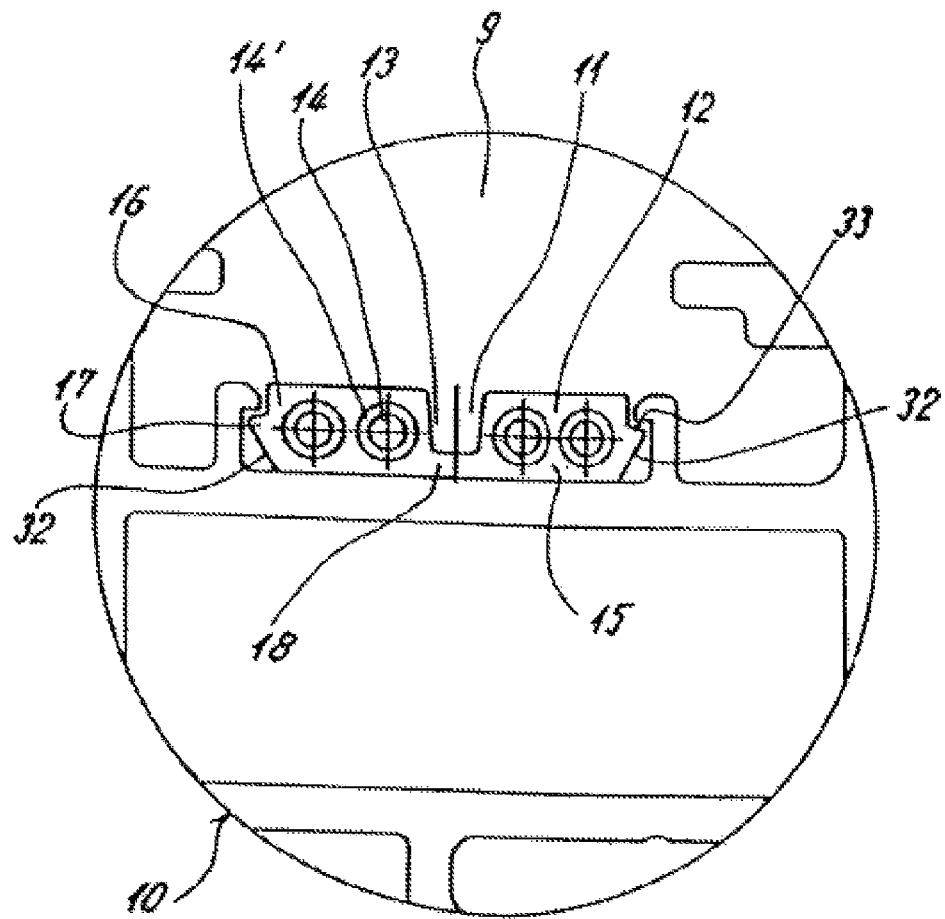
FIGS. 2 and 3 each show enlarged cutouts of the portion of FIG. 1 that is highlighted, both with and without an electrically conducting cable.

FIG. 2 shows the casement cutout 10, which is designated in FIG. 1.

One can easily see that, on the outer periphery of the casement frame section, at least one cable groove 11, which is preferably parallel to the section, is arranged to hold an electric cable 12 in a form and frictional fit. This cable groove 11 is arranged here in this embodiment at the bottom of the fitting groove 9 of the casement frame section 1. In this embodiment, the ribbon cable 12 is arranged so as not to be visible from outside. Moreover, space is saved under fitting parts. However, it is also conceivable to have the arrangement be located at any other place of the outer periphery of the section.

The ribbon cable 12 (see FIGS. 3-5) can be clamped simply an exterior of the section into the cable groove 11. The "cable groove 11 in the groove 9," which extends parallel to the section on its external side, offers the advantage that the ribbon cable 12 is placed with protection and cover, and it does not interfere with the visual appearance of the window. Moreover, locating the cable groove 11 in the fitting groove 9 reduces the difficulty of mounting any fittings in their groove 9 and also reduces interference with the ribbon cable 12 during this mounting.

It is also contemplated to provide a corresponding cable groove 11 on the window frame (not included in the representation) or in another groove of the window or a groove directly on the outer periphery; this is preferred for facades, because otherwise only the glazing rebate or recess would be available here, which would be relatively disadvantageous because of the humidity potentially trapped (or trappable) therein. However, it is preferred to use the compact arrangement of the cable groove 11 in the fitting groove 9 of the interior shell 4 of the casement frame section 1, particularly in a slit area which is directly opposite the window frame.

The casement frame section 1, depending on the design, can be used for the manufacture of a rotating window, a tipping window, a rotating/tipping window, a sliding window, or, for example, a balcony glass enclosure. Alternatively, doors or facade elements can also be manufactured, where the latter, in accordance with the terminology of this patent, also comprise ceiling elements that are transparent to light.

The cable groove 11, for receiving an electrically conducting cable, also provides an advantage if the purpose is to supply energy to functional components on the window, such as, for example, latching elements, sensors, lighting means, such as, for example, light emitting diodes, or a drive mechanism for opening and closing.

For this purpose, the ribbon cable 12 is moved, for example, from the window frame to a transitional place leading to the casement frame, and then it is led on the outer periphery of the casement frame section to the functional components that are to be controlled or supplied with energy, for example, to a drive mechanism or an electrical latching device.

The ribbon cable 12 here presents, for example, four conductors or stranded wires 14, which are arranged parallel to each other in a plane; they each are surrounded by an insulation layer 14' and are embedded in the jacket 15 or the base body 16 of the ribbon cable 12 In addition, the conductors 14 may be contacted from outside the groove, for example, by means of piercing contacts.

Between two of the central conductors 14, the cable jacket 15 or base body 16 is provided with a groove-like indentation 13, which runs parallel to the conductors 14 in their longitudinal direction. The groove 13 advantageously makes it possible to align or center the ribbon cable 12 in the groove 11, by setting a corresponding connector in contact with or in the groove. The connector presents a centering projection which engages in the indentation 13 (not visible here).

The indentation 13 has a conical (or V-shaped) cross section and it passes almost completely through the ribbon cable 12 (for example, by approximately 60-70%). When the indentation 13 is disposed in the ribbon cable 12 in this manner, the ribbon cable 12 may be bent or compressed during insertion into the cable groove 11, until it is in the cable groove, where it then expands again. The indentation 13 is also used for centering by means of a corresponding centering device (e.g., a frame element, not shown here), so that the stranded wires 14 can be contacted with precision.

The ribbon cable 12 is designed to be elastic. In particular, the jacket 15, which forms a base body 16, consists of flexible material, for example, ethylene propylene diene monomer rubber (EPDM), which permits the ribbon cable 12 to bend. This also allows the ribbon cable 12 to be positioned easily around corners on the encasement frame. Here, the cable groove 11 can also be formed on the top and/or bottom section and/or on the facing section of the casement frame, i.e., it can be completely or partially peripheral (again, this is not visible here).

The ribbon cable 12 presents, for example, four stranded wire conductors 14. However, it is also conceivable to use embodiments with one or more conductors, if, for example, only one power supply device is necessary to supply an electrical drive system, or to supply several drive systems. The storage is very simple with this ribbon cable 12.

The ribbon cable 12 presents lateral lugs (or shoulders) 17, which, in the mounted state, are elastically gripped by the bars 22 of the cable groove 11.

These lugs 17, in turn, present, on their side which points in the introduction direction into the groove, introduction bevels (or inclined surfaces) 32 which simplify introduction of the ribbon cable 12 into the cable groove 11. Additional bevels 33 on the facing side of the lugs 17, on the other hand, simplify the removal of the cable 12, for example, for repair or a similar intervention.

Figure 3:
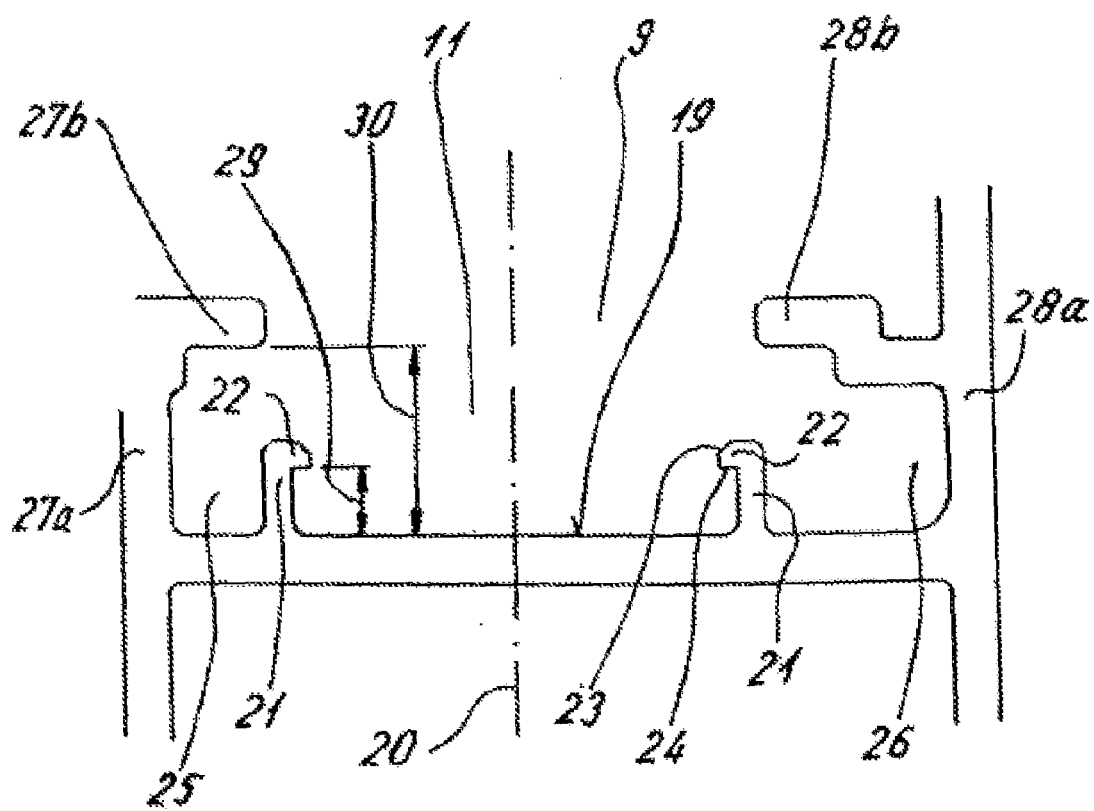

As can be seen in FIG. 3, the cable groove 11 is arranged completely inside the fitting groove 9 and it presents a symmetry axis 20. However, in the groove 9, it is in a position which is slightly offset laterally from the center, beneath its opening.

Both grooves 9 and 11 also present one and the same bottom or base 19, from which lateral bars (or projections) 21 for the cable groove 11 project at an angle, particularly a right angle.

On the free ends of these bars 21, bars (or projections) 22 are disposed that are oriented towards each other, and they constitute, in each case, undercuts for the engagement of the flat cable 12.

To simplify the mounting of the ribbon cable 12 from outside of the groove 11, or towards the groove opening side, the bars 22 are provided with bevels (or inclined surfaces) 23. The inner bar surface 24 allows the flat cable 12 to be gripped from the back. The flat cable 12 fills the groove almost completely and closes off the groove 11 with a substantially flat surface.

The groove bars 22 form lateral chambers 25 and 26 in the fitting groove 9. These chambers 25 and 26 present different sizes, resulting in an asymmetric structure in the fitting groove 9. The functional components may be held in the chambers 25, 26.

The fitting groove 9 and/or the cable groove 11 may be designed so they are peripheral on each one of the typically four frame sections of the casement frame. In this embodiment, the flat cable 12 may be used in a simple way as a placement surface for a fitting or another functional component in the groove (not visible here). The arrangement of the cable groove 11 in the fitting groove 9 is particularly advantageous, but not necessary.

The fitting groove 9 presents lateral walls 27a, 28a as well as bars (or protrusions) 27b, 28b which are turned towards the interior of the groove 9. The bars 27b, 28b are clearly thicker and longer than the bars 22 of the cable groove 11, which shows that the bars 21, 22 of the cable groove 11, which hold only the ribbon cable 12 and do not have to take over any other bearing function, can be designed in a material saving way. The fittings and the ribbon cables 12 may be arranged in a compact way in the remaining free space of the fitting groove 9 above the cable groove 11. In this manner, the ribbon cable does not interfere with the mounting of the fittings.

The heights 29 and 30 of the groove bars of the groove 9 and 11 present a ratio of 1/3, which leaves sufficient space in the fitting groove 9 for the arrangement of the fitting parts themselves and/or other functional components.

Figure 4:
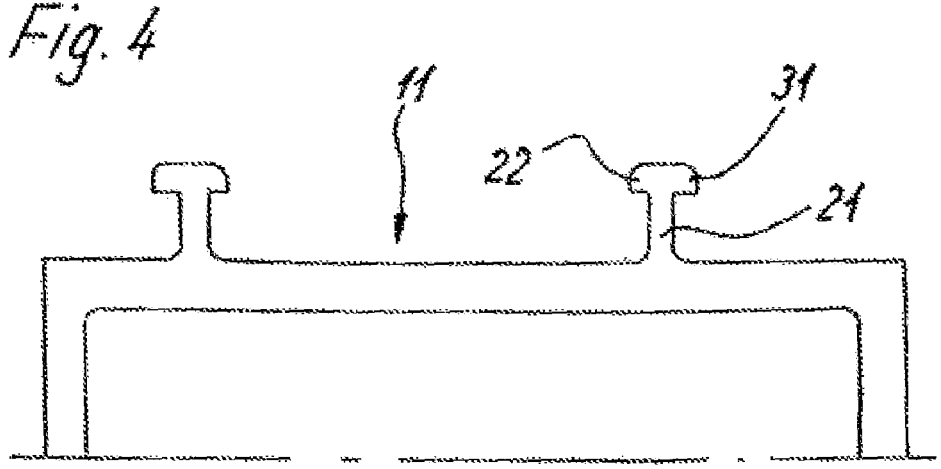
FIG. 4 shows a partial cross section of an additional embodiment of a cable groove, similar to the cable groove illustrated in FIG. 2.
Figure 5:
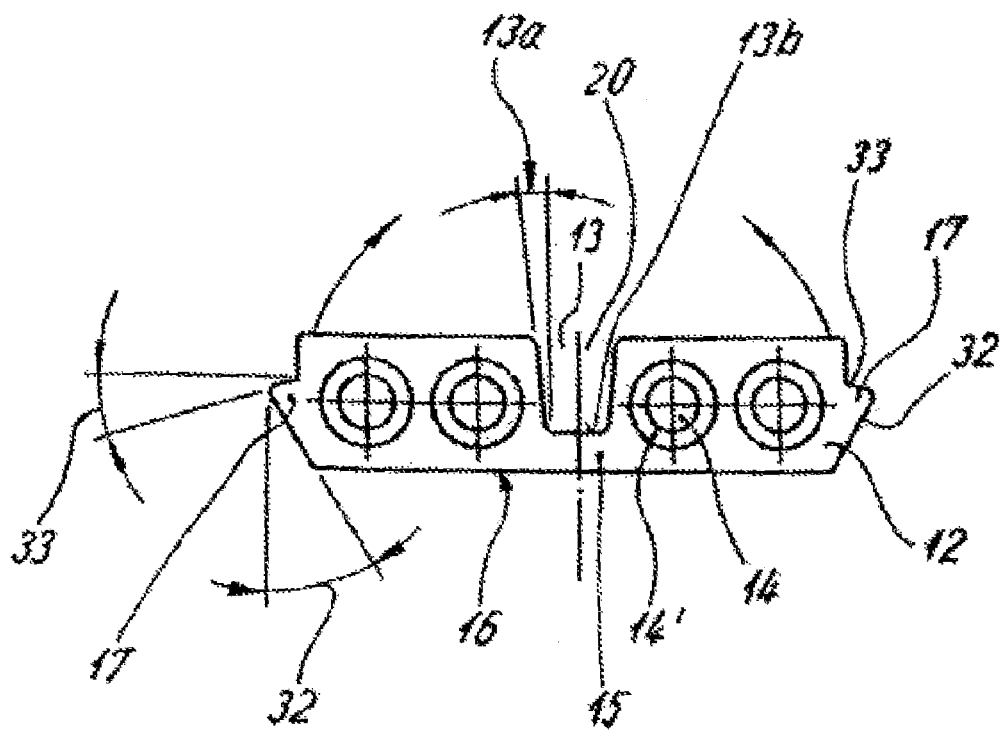
FIG. 5 shows a view of the axial end of a ribbon cable according to the invention.

FIG. 4 shows an embodiment in which additional bars (or protrusions) 31 are arranged on the side of the cable groove bars 21, which is located opposite the bars 22, where a connector element can be engaged in the additional bars for contacting the conductor of the cable 12 (not shown here). This variant is preferred, if the cable groove 11 is not arranged inside a fitting groove or similar part. Alternatively, the engagement of the connectors can also take place in the fitting groove on its bars 27, 28.

The ribbon cable 12 and the cable groove 11 are designed so that the ribbon cable 12 is engaged reliably in the cable groove 11, while still being easily moved sideways in the groove. This tolerance makes it possible to align the ribbon cable 12 in the groove 11, for example, by means of a frame, on which a connector is placed, or, for example, by means of the connector itself.

Figure 6:
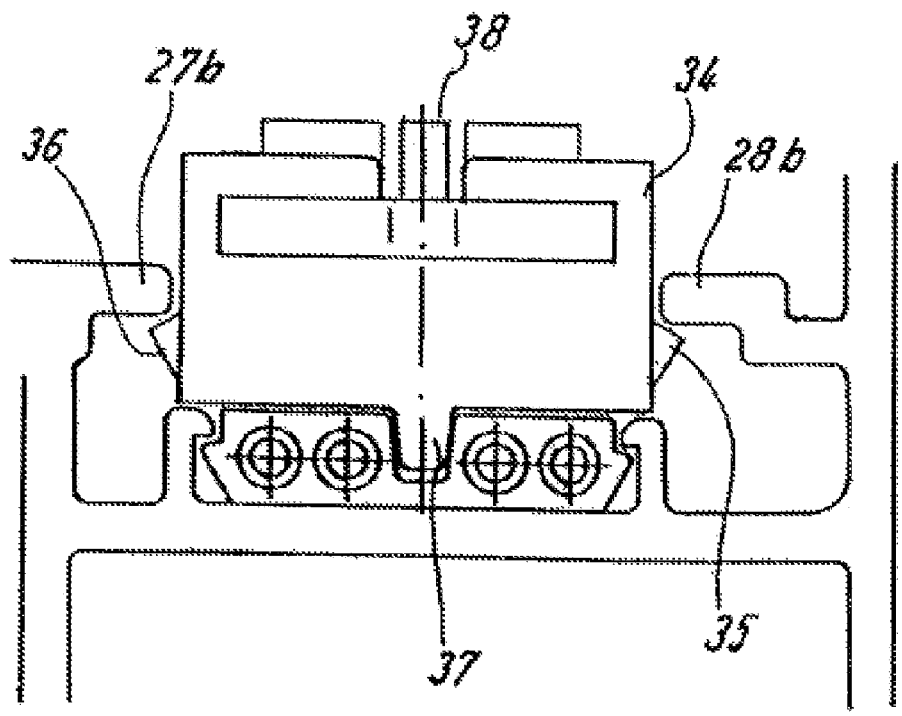
FIG. 6 shows the cable groove arrangement of FIG. 2 with a centering frame disposed therein.

FIG. 6 shows the arrangement of FIG. 2 with such a centering frame 34. This centering frame 34 can be engaged in the fitting groove 9. Here, the centering frame 34 presents lateral lugs (here engagement arches) 35, 36, which, when the frame 34 is pressed into the fitting groove 9, grip the bars 27b, 28b which are directed towards the interior, from the back, so that the frame 34 is fixed to the fitting groove 9.

On a side facing the flat cable 12, the centering frame 34 presents a bar 37 which has a shape, conical (or essentially V-shaped) in this instance, that matches the indentation 13.

If the centering frame 34 is placed in the fitting groove 9, the bar 37 becomes inserted in the indentation 13. As a result, the centering frame 34 is positioned with precision relative to the ribbon cable 12. An electrical connector (not shown here) may be placed on the frame 34. For this purpose, connectors with insulation piercing or cutting contacts (for example, piercing contacts; not shown here) are suitable. Connectors require a precise alignment so that the conducting cores 14 come into exact contact therewith. The centering frame 34 ensures this alignment.

The centering frame 34 (FIG. 7) itself includes guide bars 38, for guiding the associated connector (not shown).

The arrangement offers the great advantage that the connector, which actually contacts the ribbon cable 12, does not have to have its insulation piercing contacts directly inserted into the cable. Instead, first, an additional component, namely the centering frame 34, may be aligned precisely relative to the ribbon cable 12, and the component then guides the connector itself with precision, thus allowing a precise contacting of the conducting core of the ribbon cable 12.

Figure 9:
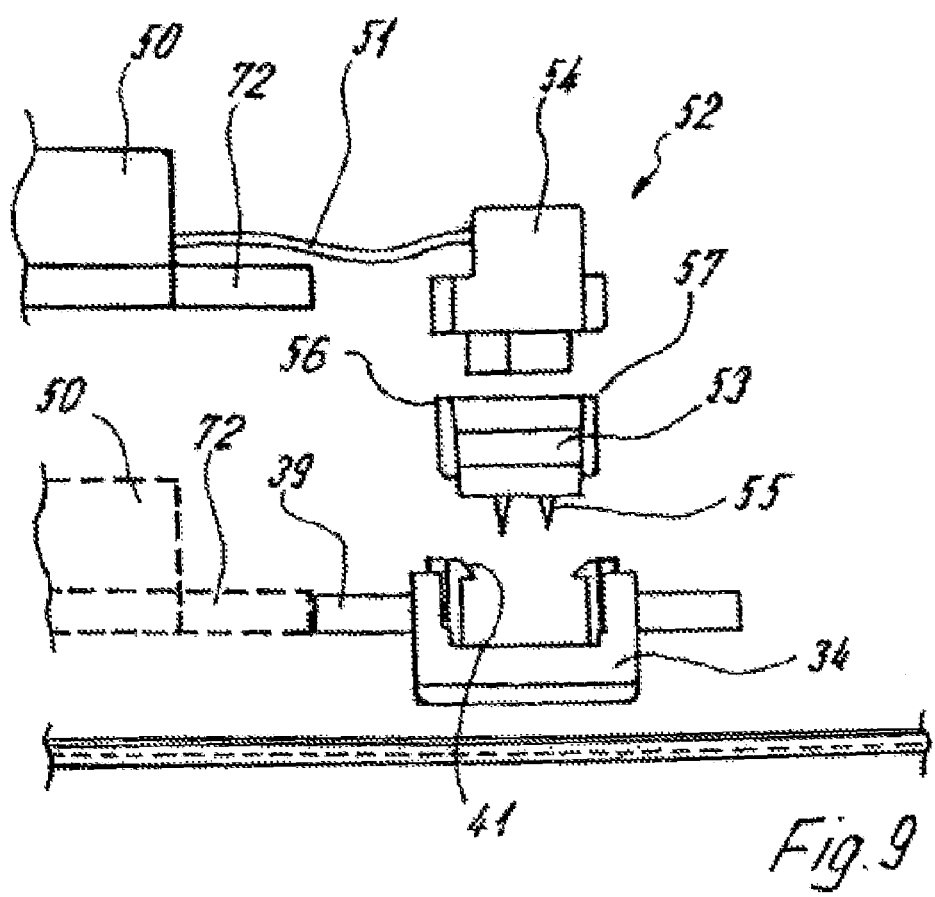
FIG. 9 shows a schematic representation of one contemplated installation of a piercing connector.
Figure 10:
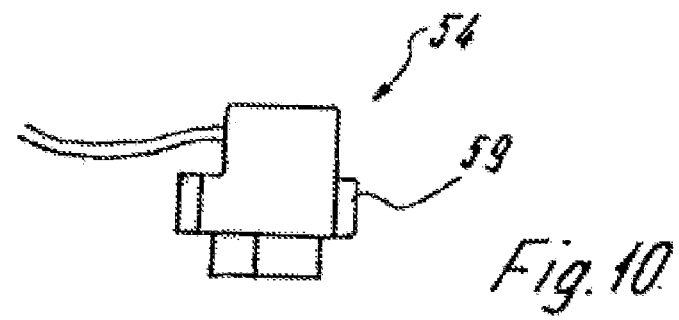
FIGS. 10-12 show different views of a first piercing connector with a cable.
Figure 11:
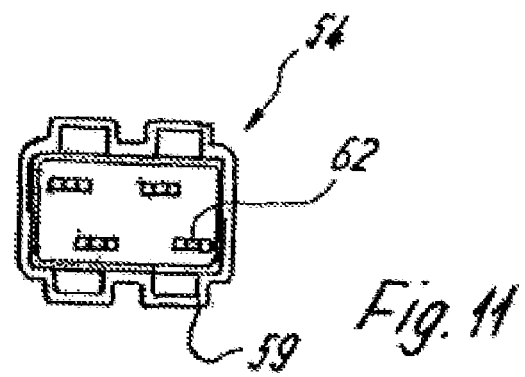
Figure 12:
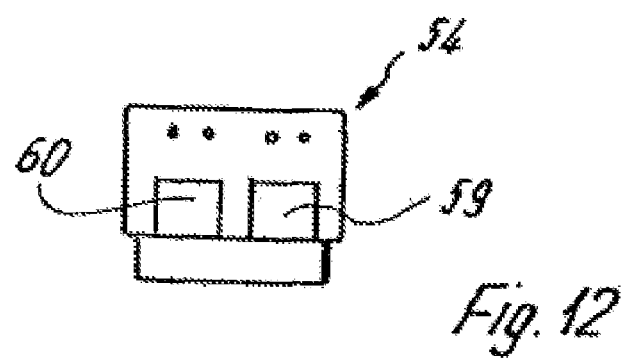
Figure 13:
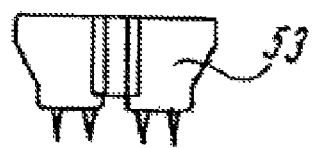
FIGS. 13-16 show different views of the bottom part of a first piercing connector.
Figure 15:
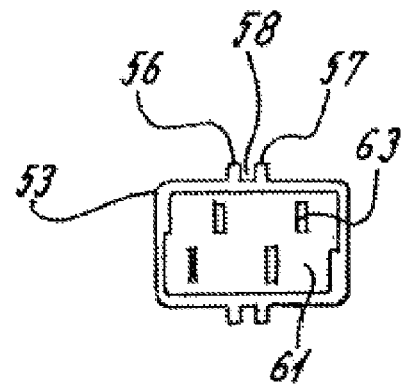
Figure 14:
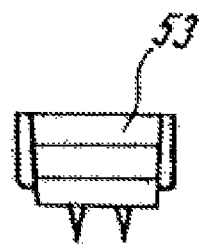

Lateral spacers 39 (here of the elastic arch type) on the centering frame 34, which extend in the longitudinal direction of the groove, allow the establishment of a precise separation between the contacting area on the cable and the adjacent (electrical) component. The component may include analogous spacers 72 (FIG. 9).

Figure 7:
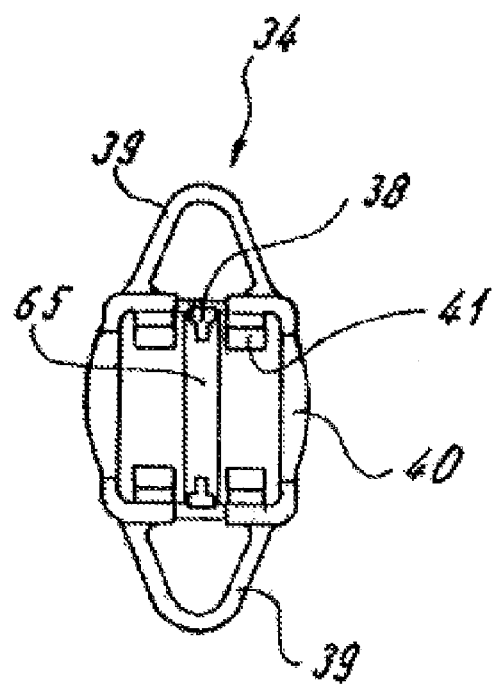
FIG. 7 shows a top view of the centering frame of FIG. 6.
Figure 8:
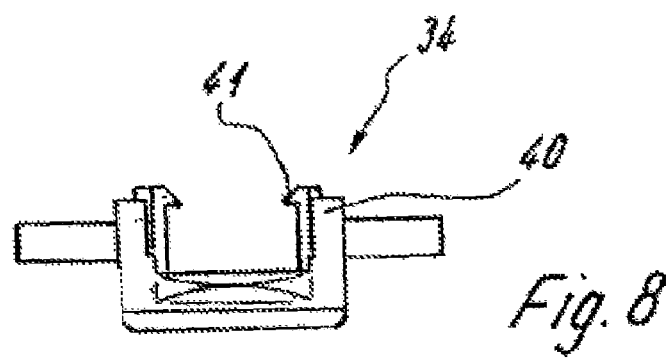
FIG. 8 shows the centering frame of FIGS. 6 and 7 in a side view which is transverse to the longitudinal direction of the groove.

As shown in FIGS. 7 and 8, the frame geometry of the centering frame 34 defines an opening within a peripheral frame 40, in which a connector or similar part may be inserted. By means of engagement hooks 41, this connector may be held on the frame in a positive fit, reliably, and in a simple way.

It is also conceivable to connect several of the centering frames 34 in the longitudinal direction of the groove so they form one part, to arrange several connectors on the flat cable 12 (not shown here) or to lead them around a corner. In this case, the centering frames may be connected to each other, for example, by film hinges (not shown here).

Alternatively, it is also conceivable to construct the centering frame 34 so that it does not engage on the fitting groove 9 but on the cable groove 11 itself (see, for example, FIG. 4), or on another peripheral groove (also not shown here).

FIG. 9 shows a power consuming component 50 for example, an electrical latching device or a drive system, or a sensor, or an illumination device, or a similar part which is represented only partially here. The power consuming component 50 may be supplied with power or, alternatively, may be supplied with electrical signals that control the operation of the power consuming component 50.

At one end, a cable 51 connects to the electrical component 50. The other end of the cable 51 includes a piercing connector 52.

The piercing connector 52 here presents two housing parts 53, 54, which can be connected to each other with a form fit. These housing parts 53, 54 are referred to below, in accordance with the representation of FIG. 9, as the connector top part 54 and the connector bottom part 53, although these appellations should not be considered to be limiting. On the connector bottom part 53, or on the side of the piercing connector 52, which faces the cable 12 in the mounting position, needle-like, insulation piercing contacts 55 are arranged or formed. In the contact position, the insulation piercing contacts 55 connect with the connector top part 54 and, thereby, to the cable 51.

The piercing connector 52 is placed with the piercing contacts 55 first on the centering frame, so that the piercing contacts 55 pierce the cable jacket 15 and the individual conductor insulations, and contact the individual conductor cores.

The centering frame 34 ensures, in a simple way, the exact alignment of the piercing connector 52 relative to the ribbon cable 12, and an exact contacting of the ribbon cable 12. In this way, the electrical components may be mounted rapidly, simply, and almost without the use of tools.

On the centering frame 34, the bottom part 53 of the piercing connector 52 is held by means of the engagement hook 41 of the centering frame 34, where the engagement hooks, when the piercing connector 54 is inserted, grip behind the corresponding piercing connector.

During mounting, it is preferred to insert first the connector bottom part 53 alone into the centering frame 34, where it contacts the conductors of the ribbon cable 12, and then becomes engaged on the frame. This has the advantage that the cable 51 on the connector top part 54 does not interfere with the mounting.

The connector top part and the connector bottom part, 53 and 54, are illustrated separately in FIGS. 10-16.

Between the bars 56, 57 of the connector bottom part 53, a type of groove 58 is formed, in which the guide bars 38 of the centering frame 34 engage during mounting, so that the connector bottom part 53 is positioned into the centering frame 34.

Then, the connector top part 54 with the cable 51 is engaged on the connector bottom part 53. In the process, small cover hoods 59 extend over the bars 56, 57 on the connector bottom part 53. The cover hoods 59 are rounded in construction, which facilitates the handling and leads to an advantageous design.

Figure 16:
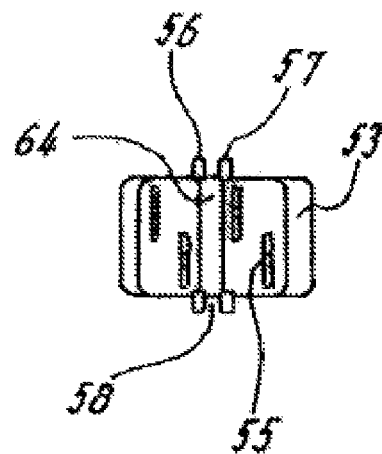

A shaft 60 (FIG. 12) is led into a recess 61 (FIGS. 15, 16) of the connector bottom part 53. Contacts 62 (for example, pins; see FIG. 11) on the connector top part 54, which are connected to the cores of the cable 51, contact the needle-like heads 63 (FIG. 15) of the piercing contacts 55, which areas are turned away from the cable 12 (FIG. 16). Depending on the installation situation, the shaft 60 may be mounted in two positions (right; left) that differ by 180°.

The bottom groove 64 on the connector bottom part 53 corresponds to a top centering bar 65 on the centering frame 34.

The cable outlet from the connector may be designed as a bore. Optionally, the cable outlet may include a seal.

The above-described arrangement offers the great advantage that the connector, for the actual contacting of the ribbon cable 12 with its insulation piercing contact, need not be inserted (or stuck) directly into the cable 12. Instead, in a first instance, an additional component, namely the centering frame 34, is aligned precisely relative to the ribbon cable 12. The centering frame 34 then guides the connector exactly, and thus allows a precise contacting of the conductor cores of the ribbon cable 12.

The arrangement of the frame 34 and the connector 52 can be carried out at nearly any place in the longitudinal extension direction of the section. The spacer 39 on the centering frame 34 ensures a precise mounting position relative to the electrical component, so that prefabricated cable lengths can be used. Mounting errors are prevented reliably.

It also is conceivable to construct the centering frame and the connector (particularly the connector bottom part) as a single part, where they would be In such an embodiment, the centering frame and the connector are contemplated to be connected, for example, by spring elements, movable bars or similar parts (not shown here).

FIGS. 17-19 show an alternative embodiment. Here, a piercing connector 66, with a housing 67 and piercing contacts 68, presents an engagement contour 69 with fitting bevels for the engagement in a groove of the frame, for example, on the bars 31 of the cable groove 11.

Before the piercing contact, 68 penetrates into the cable jacket 15 and contact the conductors 14, a centering bar 70 first aligns the cable at its indentation 13 in the groove 11 relative to the piercing connector 65.

Figure 20A:
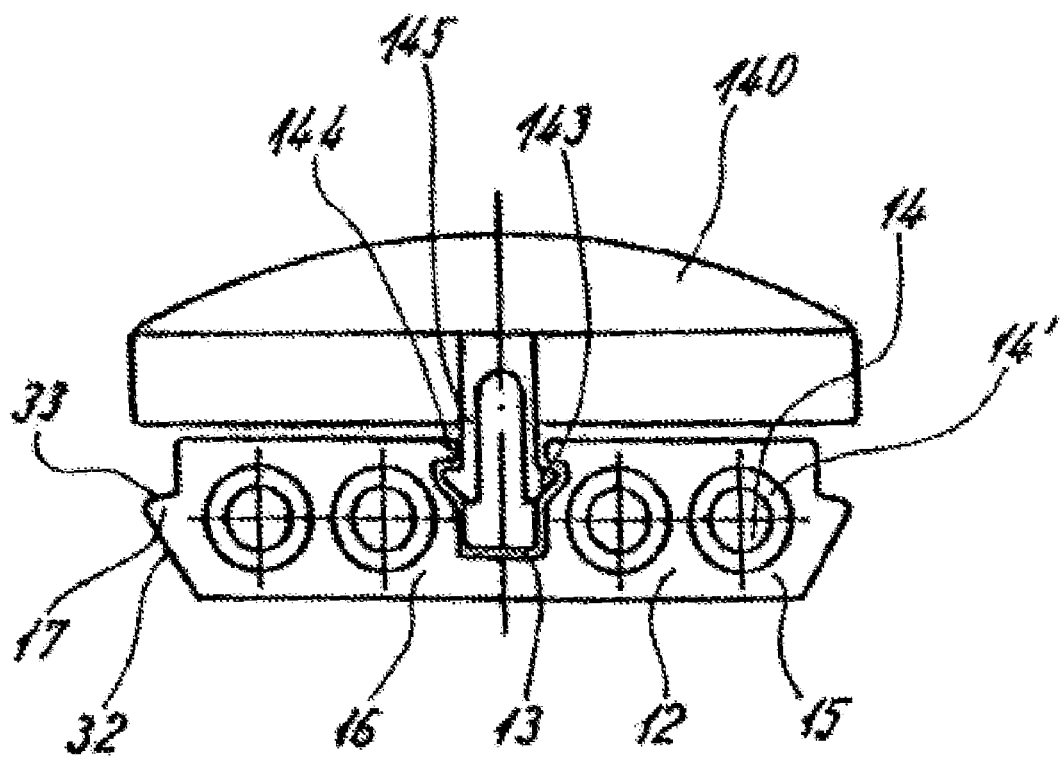
FIG. 20 shows a third piercing connector.

For this purpose, it is particularly advantageous for the centering bar 70 to be elastic, or for it to be attached by a spring element 73 to the housing 67, so that the alignment occurs first—before the spring elements are compressed (FIG. 20).

The engagement contours 69 then grip the rear surfaces of the lateral bars 22. This variant is available, for example, if the cable groove 11 is not arranged inside an additional peripheral groove.

FIGS. 18 and 19 illustrate that it is possible to connect two piercing connectors to each other by a film hinge 71 so they form one part. If the piercing contacts 68 are positioned at an appropriate angle (approximately 45° towards the interior or the exterior), it is also possible, with the help of the film hinge 71, to produce a corner connection between two flat cables on two adjacent frame sections of a window.

FIGS. 21 and 22 show such cable connections—rectangular in this case—for the internal corner 75 or for the external corner 76 of a frame or of a section joint on a facade. Here the piercing contacts are aligned parallel to a bisecting line (mitering plane) 74. The "piercing double connector" in this case is placed on the inside and on the outside corner, where the piercing contacts 68 are oriented at the appropriate angle towards the interior or towards the exterior.

The film hinge also may be designed to have a greater length, or it may be replaced by a type of prefabricated cable connection. In this case, it would not be necessary to put the piercing contact 68 in a beveled position.

Figure 23:
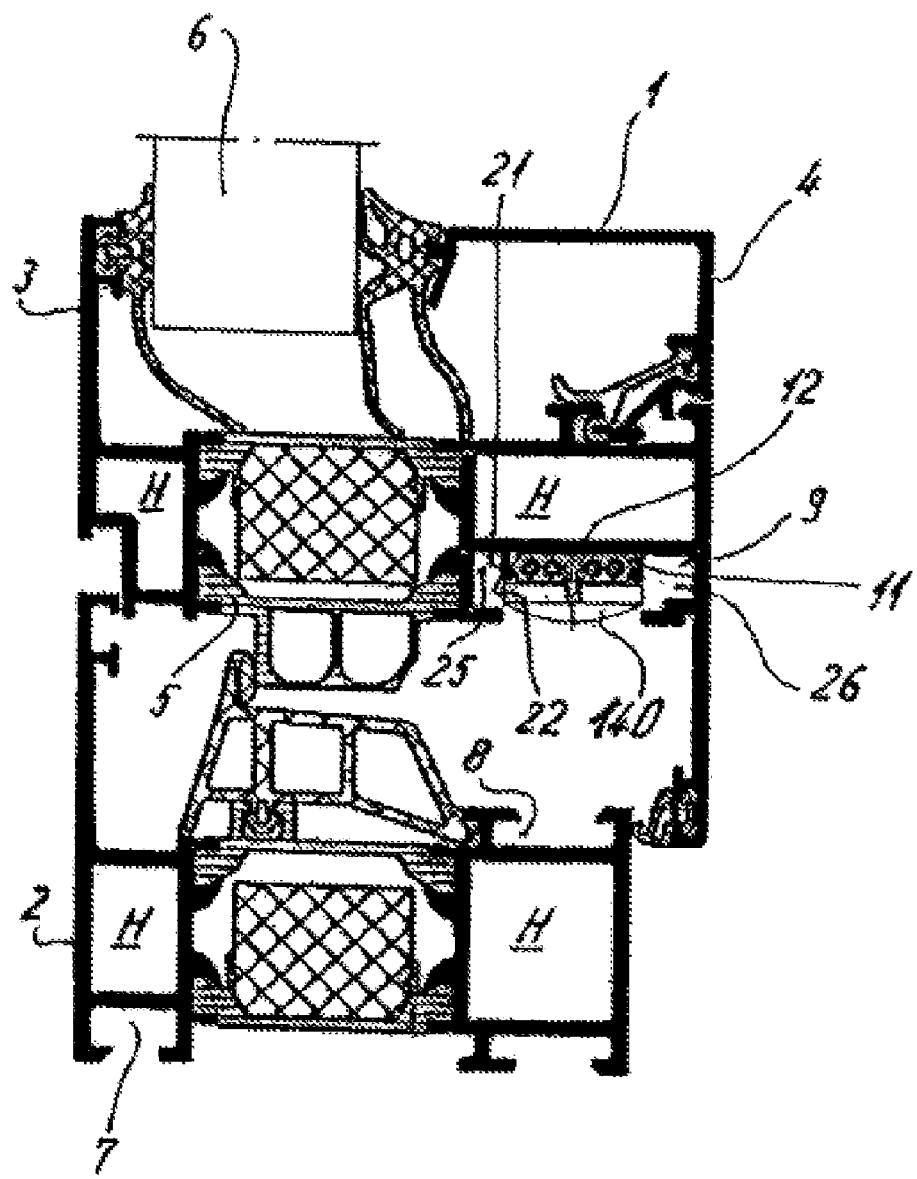
FIG. 23 shows a partial section of a window including several features of the invention.
Figure 24B:
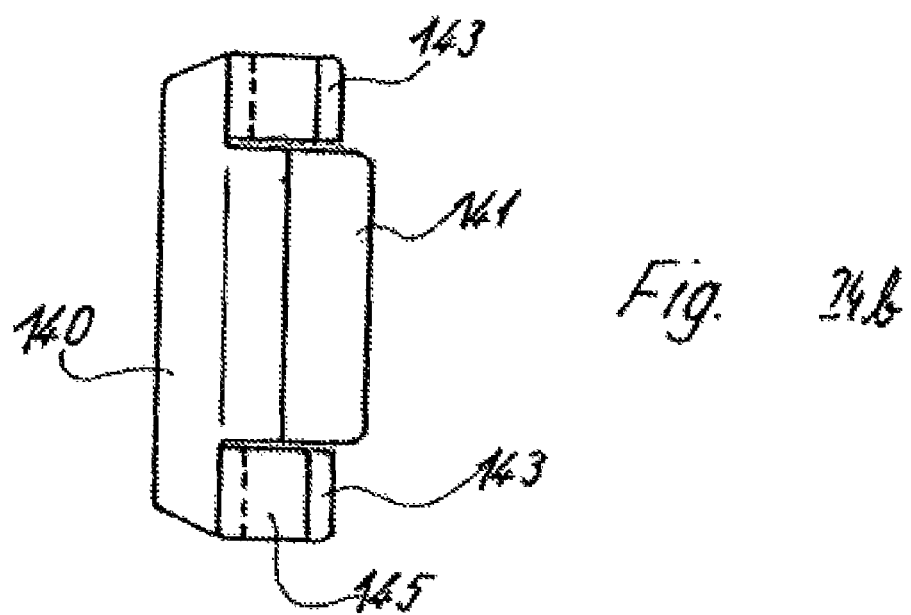

FIG. 23, in the construction presented, resembles FIG. 1. The cable jacket 15 or the base body 16 according to FIGS. 23-25 is again provided, between the two central two conductors with a groove-like indentation or centering groove 13, which runs parallel to the conductors 14 in their longitudinal direction (see particularly also FIG. 3). This arrangement facilitates alignment or centering of the ribbon cable in the groove, by the placement of a corresponding connector or a connector part 140 on the groove. The connector 140 includes a centering projection 141 (FIG. 25, FIG. 24b), which engages in the indentation 13 in the cable. The centering projection 141 has an extension which is such that it first aligns the cable and the connector relative to each other, before the contacting of the conductor cores occurs via the insulation piercing or cutting contacts, which are schematically represented in FIG. 25, particularly piercing contacts 142 (FIG. 24).

Fittings and ribbon cables 12 may be arranged in a compact way in the free space of the fitting groove 9, without the ribbon cable impeding the mounting of the fittings. Enough space remains in the fitting groove 9 for the arrangement of the fitting parts themselves and/or other functional components.

The ribbon cable 12 and the cable groove 11 are constructed so that the ribbon cable 12 is securely engaged in the cable groove 11, although it remains laterally movable in the groove 11. This tolerance makes it possible to align the ribbon cable 12 in the cable groove 11.

Figure 24C:
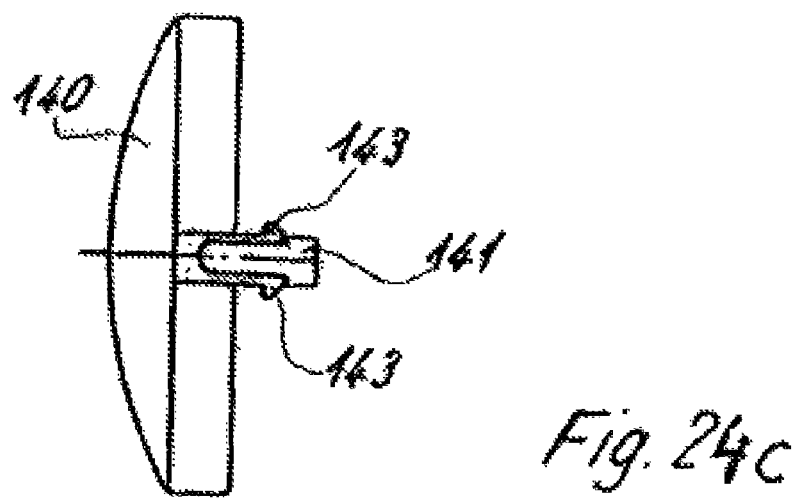
Figure 25:
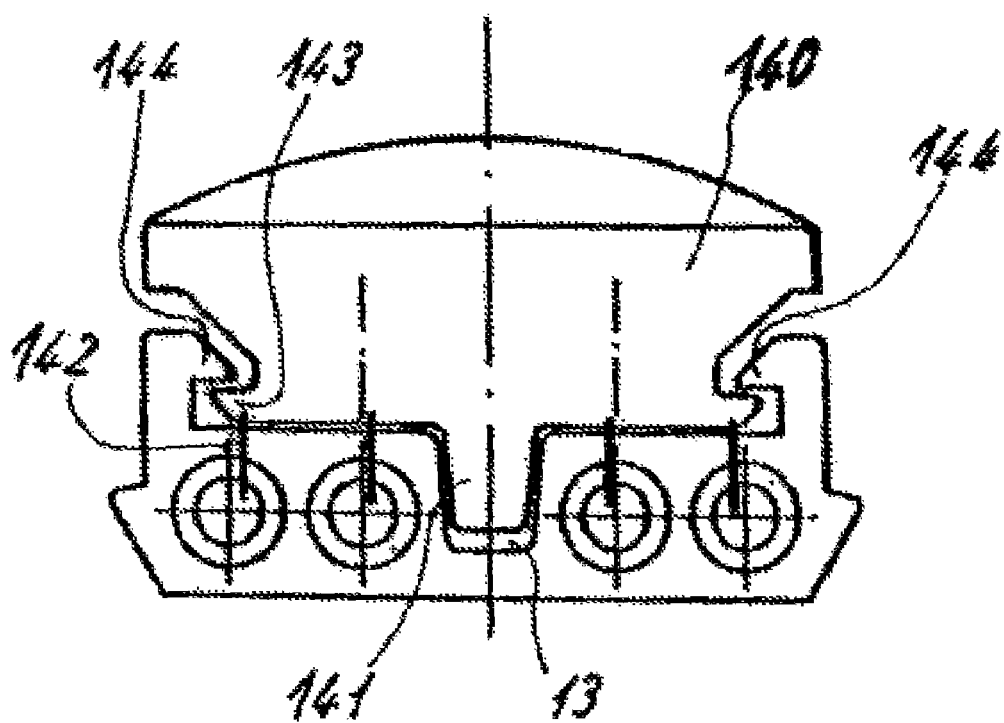
FIG. 25 shows an alternative embodiment of a ribbon cable with an additional connector.

On a side facing the flat cable 12, the connector 140 of FIGS. 24 and 25 presents a centering bar 141. Corresponding engagement means 143, 144 on the ribbon cable 12 and the connector 140 secure the connector 140 on the ribbon cable 12 in a way so the connector cannot be lost. Alternatively, another type of mounting or attachment for securing the connector 140 also is contemplated, such as a clamp seat of the connector on the ribbon cable 12 (not visible here).

The piercing contacts 142 contact the conductors (shown only schematically here). The engagement means 143, 144, the centering projection 141, and the piercing contacts 142 preferably are adapted to each other in such a way that first the alignment on the centering projection 141 occurs, then the contact, and finally the engagement (not shown here).

According to FIG. 25, the engagement means 143, 144 (hooks and recesses) (relative to the flat cable surface) are provided above the centering bar 141.

According to FIG. 24, on the other hand, in the axial direction of the connector part or of the ribbon cable, the centering bar 141 is replaced in segments by engagement bars 145 with the engagement means 143, which work in cooperation with corresponding engagement means 144 (undercuts 144 in the indentation) on the ribbon cable.

The variants of FIGS. 24 and 25 also ensure an easy mounting with a protected arrangement of the cable and the connector 140 in the fitting groove 9.

The invention claimed is:

1. One selected from a frame section for a window, a casement frame of a window, door, and a facade, comprising:
a cable groove arranged on an outer periphery of the section, wherein the cable groove defines an undercut area
a cable retained within the undercut area of the cable groove, wherein the cable comprises a plurality of conductors;
a centering frame engageable with the electric cable in the cable groove, wherein the centering frame is attachable to the cable and to the section; and
wherein the cable further comprises a cable jacket provided with a groove-like indentation, and wherein the centering frame comprises a bar that engages the indentation.

2. The frame section according to claim 1, wherein the cable is a ribbon cable, and the plurality of conductors are disposed parallel to one another and are arranged in a plane.

3. The frame section according to claim 2, wherein the ribbon cable comprises lateral lugs that are constructed to elastically grip behind first bars flanking the cable groove.

4. The frame section according to claim 1, wherein the indentation and the bar run parallel to the plurality of conductors.

5. The frame section according to claim 1, wherein the indentation and the bar—present corresponding, tapered cross sections.

6. The frame section according to claim 1, wherein the centering frame comprises guidance bars for a piercing connector.

7. The frame section according to claim 1, wherein the centering frame further comprises lateral spacers that extend in the longitudinal direction of the cable groove.

8. The frame section according to claim 1, wherein the centering frame comprises a plurality of centering frames connected to each other in the longitudinal direction of the cable groove.

9. One selected from a frame section for a window, a casement frame of a window, door, and a facade, comprising:
a cable groove arranged on an outer periphery of the section, wherein the cable groove defines an undercut area;
a cable retained within the undercut area of the cable groove, wherein the cable comprises a plurality of conductors;
a centering frame engageable with the electric cable in the cable groove, wherein the centering frame is attachable to the cable and to the section; and
wherein the centering frame further comprises a piercing, contact connector.

10. The frame section according to claim 9, wherein the cable groove—is formed within a fitting groove on the frame section, wherein the fitting groove is adapted to receive fittings, and wherein the centering frame is constructed to engage the fitting groove.

11. The frame section according to claim 9, wherein the centering frame is designed for engagement on the fitting groove.

12. The frame section according to claim 9, wherein the centering frame is constructed for engagement in the cable groove.

13. The frame section according to claim 9, wherein the centering frame and the connector are connected to form one part, but they are movable relative to each other.

14. The frame section according to claim 9, wherein corresponding engagement portions engage on the cable and the connector, latching the connector to the cable.

15. The frame section according to claim 14, wherein the centering bar comprises engagement bars with engagement, portions, which cooperate with corresponding engagement portions in the indentation of the cable.

16. The frame section according to claim 15, the engagement portions are constructed with spatial separation from the centering bar and the indentation on the cable and on the connector.

17. The frame section according to claim 16, wherein the engagement portions, the centering projection and the piercing contacts are adjusted to each other so that, during the mounting of the connector on the cable, the alignment on the centering projection occurs first, and then the contacting, and finally the engagement.

18. One selected from a frame section for a window, a casement frame of a window, door, and a facade, comprising:
a cable groove arranged on an outer periphery of the section, wherein the cable groove defines an undercut area;
a cable retained within the undercut area of the cable groove, wherein the cable comprises a plurality of conductors;
a centering frame engageable with the electric cable in the cable groove, wherein the centering frame is attachable to the cable and to the section; and
wherein the centering frame is attached to the section via at least one screw.

19. The frame section according to claim 18, wherein the centering frame comprises lateral lugs adapted to grip behind second bars that are disposed on delimitation bars.

20. One selected from a frame section for a window, a casement frame of a window, door, and a facade, comprising:
a cable groove arranged on an outer periphery of the section, wherein the cable groove defines an undercut area:
a cable retained within the undercut area of the cable groove, wherein the cable comprises a plurality of conductors:

a centering frame engageable with the electric cable in the cable groove, wherein the centering frame is attachable to the cable and to the section:

wherein the centering frame comprises guidance bars for a piercing connector; and wherein the centering frame further comprises engagement hooks for engagement of the piercing connector.

21. One selected from a frame section for a window, a casement frame of a window, door, and a facade, comprising:

a cable groove arranged on an outer periphery of the section, wherein the cable groove defines an undercut area a cable retained within the undercut area of the cable groove, wherein the cable comprises a plurality of conductors;

a centering frame engageable with the electric cable in the cable groove, wherein the centering frame is attachable to the cable and to the section; and a connector, mounted on the section, including insulation piercing contacts for contacting the plurality of conductors.

22. The frame section according to claim 21, wherein the insulation piercing contacts are constructed as piercing contacts.

23. The frame section according to claim 21, wherein the connector directly or indirectly engages one of either the cable groove or another groove.

24. The frame section according to claim 21, wherein the connector is inserted in the centering frame.

25. The frame section according to claim 21, wherein the piercing connector comprises a connector top part and a connector bottom part which are connectible to each other.

26. The frame section according to claim 25, wherein the piercing contacts are formed on the connector bottom part.

27. The frame section according to claim 25, wherein the connector bottom part engages the centering frame.

28. The frame section according to claim 25, wherein the connector top part engages the connector bottom part.

29. The frame section according to claim 25, wherein the connector bottom part and the centering frame present mutually corresponding guidance contours for introducing the connector bottom part into the centering frame.

30. The frame section according to claim 25, wherein, on the connector top part, a shaft is formed for insertion into a recess on the connector bottom part.

31. The frame section according to claim 25, wherein the connector top part is insertable into different positions in the connector bottom part.

32. The frame section according to claim 25, wherein, on the connector bottom part, a bottom groove is formed, which cooperates with a top centering bar on the centering frame.

33. The frame section according to claim 25, wherein an engagement contour is formed directly on the connector for engagement on the cable groove.

34. The frame section according to claim 25, wherein a centering bar is formed directly on the connector for engagement in the indentation of the cable.

35. The frame section according to claim 34, wherein the centering bar is elastic and is connected with the housing of the connector by at least one compressible spring element.

36. The frame section according to claim 34, wherein the indentation and the centering bar present corresponding, conically tapering, cross sections.

37. The frame section according to claim 36, wherein the connector part presents a centering bar on its side facing the cable.

38. The frame section according to claim 21, wherein two of the piercing connectors are connected to one another by a film hinge with integrated conductors.

39. The frame section according to claim 38, wherein the piercing connectors are arranged in a 45° position at an angle with respect to one another.

40. One selected from a frame section for a window, a casement frame of a window, door, and a facade, comprising:

a cable groove arranged on an outer periphery of the section, wherein the cable groove defines an undercut area;

a cable retained within the undercut area of the cable groove, wherein the cable comprises a plurality of conductors;

a centering frame engageable with the electric cable in the cable groove, wherein the centering frame is attachable to the cable and to the section; and a connector, mounted on the cable, comprising insulation piercing contacts for contacting the plurality of conductors.

41. The frame connector according to claim 40, the connector engages the cable.

42. The frame section according to claim 41, wherein the connector clamps firmly to the cable.

* * * * *